United States Patent [19]
Janiszewski

[11] 3,795,160
[45] Mar. 5, 1974

[54] GUIDING MEANS FOR BORING BARS

[76] Inventor: Kasimir Janiszewski, 11908 W. Loomis Rd., Franklin, Wis. 53132

[22] Filed: Sept. 29, 1972

[21] Appl. No.: 293,604

[52] U.S. Cl. ................................. 82/1.4, 408/82
[51] Int. Cl. ........................................ B23b 41/06
[58] Field of Search..... 408/82, 201, 202, 203, 197, 408/200, 80, 100, 241, 113–115, 3; 82/1.4

[56] References Cited
UNITED STATES PATENTS

| | | | |
|---|---|---|---|
| 2,747,948 | 5/1956 | Jergens | 408/82 X |
| 1,821,926 | 9/1931 | Booth | 408/82 X |
| 2,257,609 | 9/1941 | Kollath | 408/202 X |

*Primary Examiner*—Leonidas Vlachos
*Attorney, Agent, or Firm*—Henry C. Fuller

[57] ABSTRACT

Apparatus for boring holes with a rotatable boring bar includes a guide tool or element located at the free end of the boring bar and projecting in the same direction as the boring tool. A hardened bushing concentrically aligned with the boring bar engages and guides the guide tool to prevent deflection of the working tool during use. The hardened bushing and guide tool enable the boring tool to provide a hole with a uniform radius.

5 Claims, 3 Drawing Figures

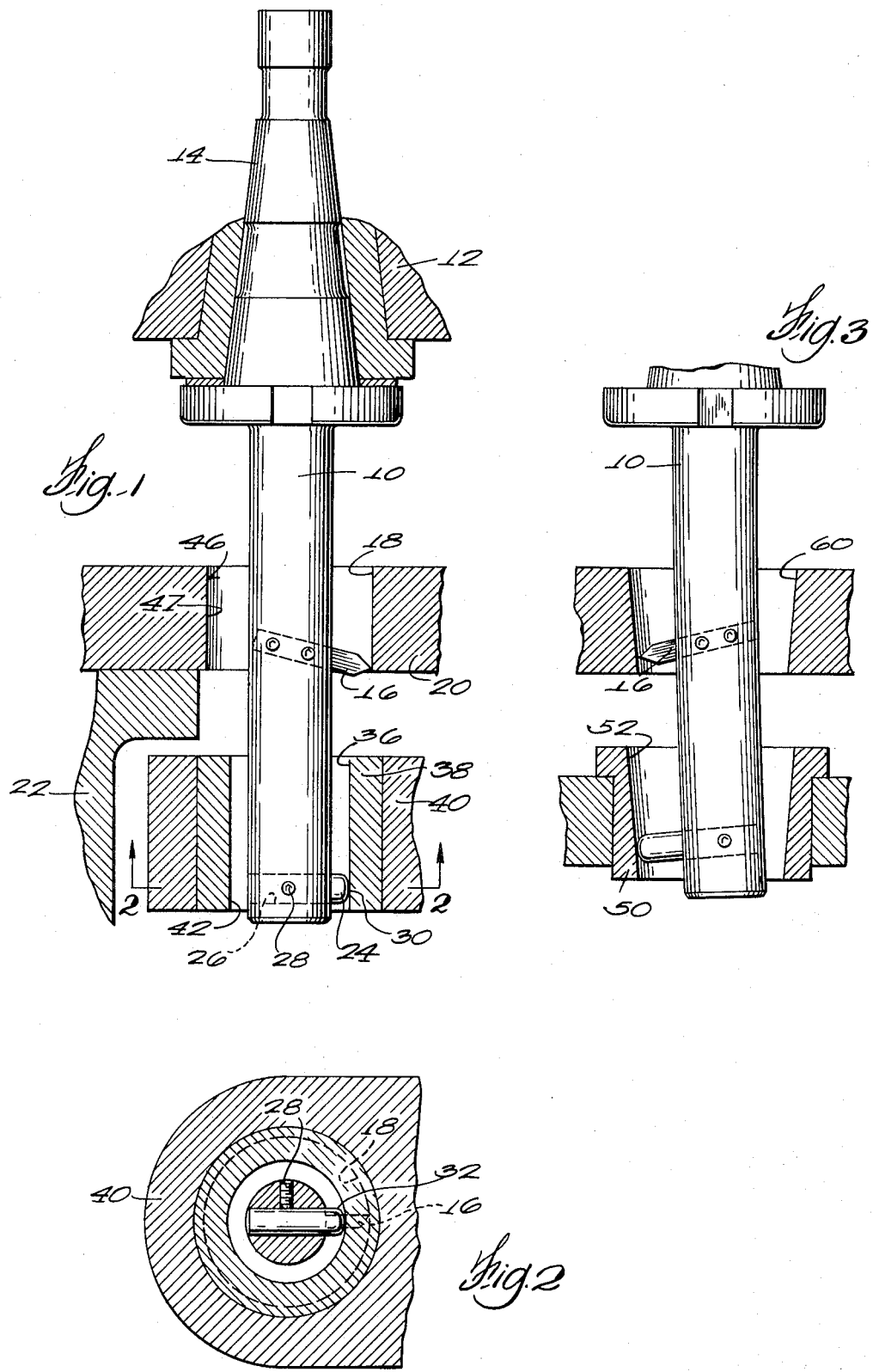

3,795,160

GUIDING MEANS FOR BORING BARS

BACKGROUND OF INVENTION

With the use of rotary boring bars, a uniform radius throughout the work piece is difficult because of slight deflections of the boring bar during use. At high boring bar speeds, the machined bores in the work piece are generally slightly greater in radius at the end of the bore remote from the boring bar holder than at the beginning of the bore.

SUMMARY OF INVENTION

The invention provides apparatus for guiding the boring bar to insure a uniform radius throughout the axial length of the bored hole. The apparatus includes a guide tool or guide element located adjacent the free end of the boring bar and spaced from the work piece. A hardened bushing is supported adjacent the guide tool in perfect axial and concentric alignment with the boring bar to prevent deflection of the bar and provide a uniform radius in the bored hole. The inner surface of the bushing engages and guides the boring bar as it is moved longitudinally through the work piece. The guide tool can also be employed with a tapered bushing to deflect the boring bar for machining a tapered bore the same size or proportional in size to the tapered surface in the guide bushing.

Further objects, advantages and features of the invention will become apparent from the following disclosure.

DRAWINGS

FIG. 1 is an elevational view of a boring bar and boring bar guide apparatus of the invention with some parts shown fragmentarily in section.

FIG. 2 is a sectional view along line 2—2 of FIG. 1.

FIG. 3 is a diagrammatic side elevational view with parts in fragmentary section of a modified embodiment of some of the guide apparatus of the invention employed for boring a tapered hole with the taper exaggerated.

DESCRIPTION OF PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In the drawings, FIG. 1 shows a boring bar 10 supported for longitudinal movement and rotary movement in a chuck 12 on a boring tool holder 14. The boring bar has a radially adjustable and projecting working tool 16 which is shown in engagement with the surface 18 of a work piece 20 carried on a support 22. As thus far described, the parts are conventional.

The invention provides a guide tool or guide element 24 which is radially adjustably mounted in a cross aperture or slot 26 of the boring bar 10 with the position fixed by a set screw 28 or the like. The guide tool 24 can be cylindrical in configuration with the projecting end provided with a radius or rounded at 30 and 32.

The working tool 16 engages the surface 36 of a hardened bushing 38 supported in a bushing holder 40 in perfect concentric alignment with the boring bar 10. The aperture 42 in the bushing 38 is not required to be of the same diameter as the aperture being bored because of the radial adjustability of both the guide tool 24 and working tool 16. The guide tool 24, however, should project in the same radial direction as the working tool 16 to obtain maximum benefits of the invention.

In use, the boring bar 10 is moved through the predrilled aperture 42 commencing at the upper end 46 of the work piece 20. The guide tool 24 and bushing 38 prevent deflection of the boring bar to provide a bore 47 with a true cylindrical surface of uniform radius.

FIG. 3 shows a modified embodiment in which the guide bushing 50 has a tapered surface 52 to guide the working tool 16 on a path which will provide a tapered aperture 60 in the work piece. The taper is greatly exaggerated in the drawing in FIG. 3. Guide bushings with various configurations can be employed to deflect the boring bar and provide bored apertures with surfaces concentric or proportional with the surfaces of the guide bushing.

What is claimed is:

1. In apparatus for boring holes including a rotatable and longitudinally movable boring bar having a free end and a projecting tool for engaging and removing material from a bore in a work piece, the improvement comprising a guide element on said boring bar projecting in the same radial direction as said projecting tool and located in advance of said tool at the free end of said boring bar, and a guide bushing separate from said work piece and supported in concentric alignment with said boring bar and engageable with said guide element to guide said boring bar to bore a hole in the work piece concentric with said bushing.

2. Apparatus in accordance with claim 1 wherein said guide element on said boring bar is adjustable radially and including means on said boring bar for adjustably mounting said guide element to afford radial adjustment of the position of the guide element with respect to said boring bar.

3. Apparatus in accordance with claim 1 wherein said bushing has a taper proportional to the desired taper of the work piece.

4. Apparatus in accordance with claim 1 wherein said guide element has a cylindrical shank with a radius on the end engaging the bushing.

5. In apparatus for boring holes including a rotatable and longitudinally movable boring bar having a projecting tool for engaging and removing material from a bore in a work piece, the improvement comprising a guide element on the boring bar adjacent the end of the boring bar remote from the boring bar holder and in advance of said tool and projecting in the same radial direction with respect to said boring bar as said projecting tool, and a guide bushing spaced axially from said work piece in the direction of longitudinal movement of said boring bar and having a bushing surface engageable with said guide element to guide said boring bar to bore a hole in the work piece proportional in configuration with said bushing.

* * * * *